United States Patent [19]

Lambley

[11] Patent Number: 4,570,077

[45] Date of Patent: Feb. 11, 1986

[54] WASTE HEAT RECOVERY SYSTEM DRIVEN ALTERNATORS AND AUXILIARY DRIVE SYSTEMS THEREFOR

[75] Inventor: Ian G. Lambley, Tyne and Wear, England

[73] Assignee: British Shipbuilders (Engineering and Technical Services), Ltd., Sunderland, England

[21] Appl. No.: 511,054

[22] Filed: Jul. 5, 1983

[30] Foreign Application Priority Data

Jul. 6, 1982 [GB] United Kingdom ............... 8219490

[51] Int. Cl.$^4$ ........................................... F01K 23/10
[52] U.S. Cl. ................................. 290/4 R; 290/1 R; 290/2; 290/4 C; 60/618
[58] Field of Search ......................... 290/1 R, 2, 4, 40; 60/595, 597, 616, 618

[56] References Cited

U.S. PATENT DOCUMENTS

| | | | |
|---|---|---|---|
| 1,713,649 | 5/1929 | Fletcher | 290/4 C |
| 3,165,897 | 1/1965 | Coats et al. | 290/4 C X |
| 3,345,517 | 10/1967 | Smith | 290/4 R |
| 3,477,013 | 11/1969 | Smith | 290/4 R X |
| 3,675,112 | 7/1972 | Smith | 290/4 D X |
| 4,010,378 | 3/1977 | Tharpe et al. | 290/2 |
| 4,038,558 | 7/1977 | Gallois | 290/52 |
| 4,049,972 | 9/1977 | Crowdy et al. | 60/618 X |
| 4,077,748 | 3/1978 | Pötz | 290/4 R X |
| 4,186,312 | 1/1980 | Dvorak | 290/4 R |
| 4,309,914 | 1/1982 | Hiersig et al. | 74/15.4 |
| 4,394,582 | 7/1983 | Kreissl et al. | 290/2 X |

FOREIGN PATENT DOCUMENTS

| | | |
|---|---|---|
| 920408 | 3/1963 | United Kingdom . |
| 928140 | 6/1963 | United Kingdom . |
| 937038 | 9/1963 | United Kingdom . |
| 1046030 | 10/1966 | United Kingdom . |
| 1496374 | 12/1977 | United Kingdom . |
| 2055259 | 2/1981 | United Kingdom . |
| 2081425 | 2/1982 | United Kingdom . |

*Primary Examiner*—Bernard Roskoski
*Assistant Examiner*—Shik Luen Paul Ip
*Attorney, Agent, or Firm*—Beveridge, DeGrandi & Weilacher

[57] ABSTRACT

An auxiliary drive system for a waste heat recovery system driven alternator having a rotor, comprises a hydraulic drive means for driving the alternator rotor and means for engaging and disengaging the hydraulic drive means and the alternator rotor. The hydraulic drive means and the alternator rotor are engaged for the hydraulic drive means to drive the alternator rotor and disengaged when the alternator rotor speed is marginally above a predetermined speed.

11 Claims, 1 Drawing Figure

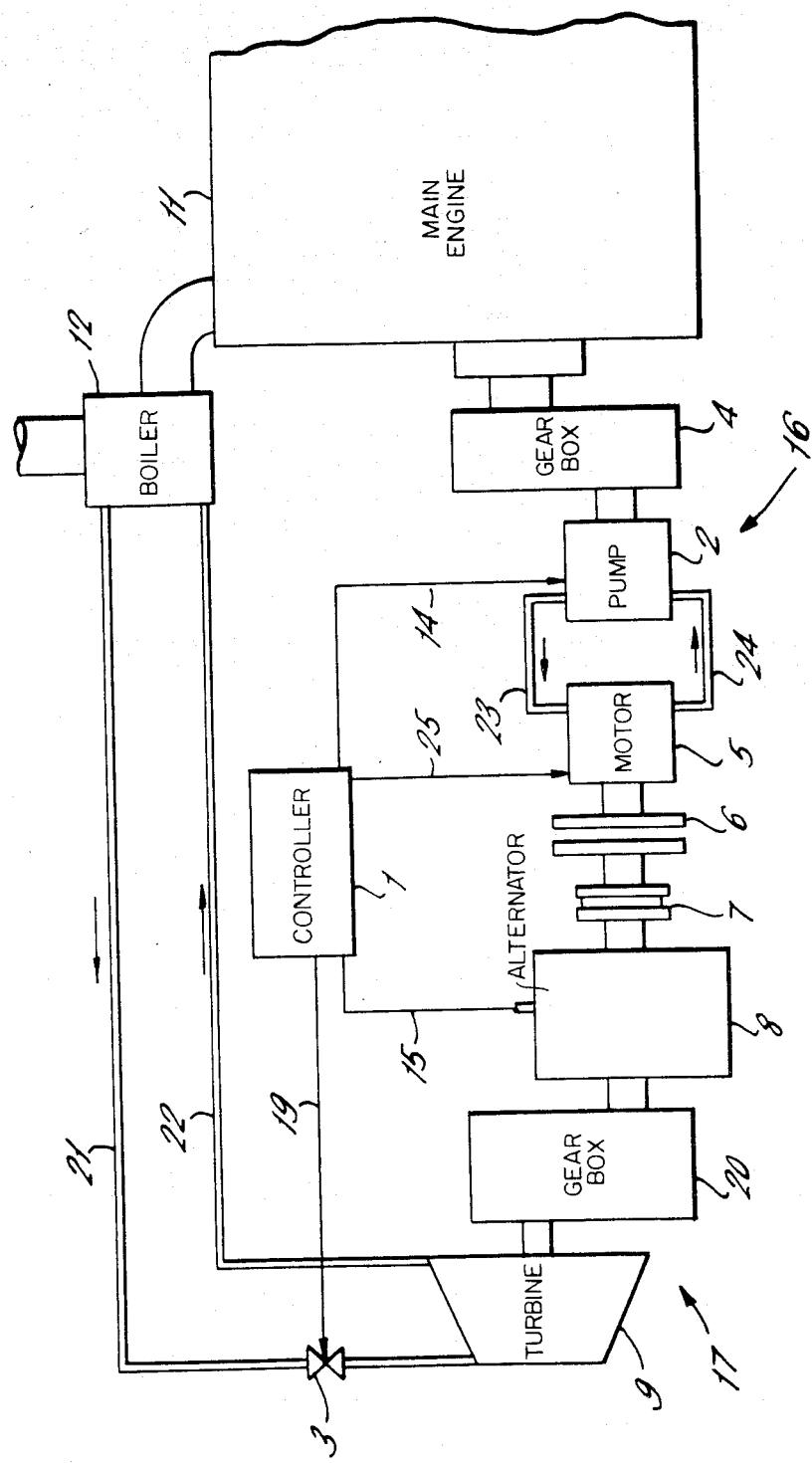

WASTE HEAT RECOVERY SYSTEM DRIVEN ALTERNATORS AND AUXILIARY DRIVE SYSTEMS THEREFOR

BACKGROUND OF THE INVENTION

1. Field of the Invention

The present invention relates to waste heat recovery system driven alternators and auxiliary drive systems therefor, more particularly, but not exclusively for ships.

2. Prior Art

A proportion of the electrical load required by a ship can be provided by energy extracted from the main propulsion diesel engine exhaust gas using a waste heat recovery plant. When the main engine is not operating at full load, the waste heat recovery plant may not be able to sustain the full electrical load required. An object of the invention is to supply extra power to sustain the electrical load.

SUMMARY

According to the invention, there is provided an auxiliary drive system for a waste heat recovery system driven alternator having a rotor, the auxiliary drive system comprising hydraulic drive means for driving the alternator rotor and means for engaging and disengaging the hydraulic drive means and the alternator rotor, the hydraulic drive means and alternator rotor being engaged for the hydraulic drive means to drive the alternator rotor and disengaged when the alternator rotor speed is marginally above a predetermined speed. Preferably, said predetermined speed is marginally below the synchronous speed of the alternator rotor.

The drive for the alternator from the waste heat recovery system preferably includes valve means for controlling the drive for the alternator from the waste heat recovery system to maintain the speed of the alternator rotor at synchronous speed, and wherein engagement and disengagement of the hydraulic drive means is actuated by a signal indicating that the valve means are respectively fully open or beginning to close.

The means for engaging and disengaging the hydraulic drive means is preferably a clutch.

It is preferred that the hydraulic drive means are driven by an engine from which the waste heat is derived.

Preferably, the hydraulic drive means comprises at least one hydraulic motor supplied with oil from one or more hydraulic pumps. The or each hydraulic motor may be of the axial piston type.

The or each hydraulic pump may be mounted on the engine and driven by a gear train from the engine, in which case the gear train and the swept volume of the pump are arranged to supply the desired power to the hydraulic motor or motors over a wide range of engine speeds and loads. The or each pump may be pressure controlled to avoid excess pressures.

Preferably, the or each hydraulic pump is of the axial piston variable delivery type. In the case of more than one hydraulic motor being used to drive the alternator rotor, a gear train may be employed.

Preferably, a coupling means is provided between the engagement and disengagement means and the alternator rotor. The coupling means may be a gear coupling which preferably is capable of allowing for any misalignment in the coupling.

The invention also provides a waste heat recovery system comprising a main drive to an alternator which alternator also has an auxiliary drive system as defined above. Preferably the main drive to the alternator is a steam turbine.

BRIEF DESCRIPTION OF THE DRAWING

The drawing shows diagrammatically, by way of example, a waste heat recovery system driven alternator having an auxiliary system.

DESCRIPTION OF THE PREFERRED EMBODIMENT

On a ship, the main energy source is a main engine, from which not only motive power for the ship, but also the power to supply an electrical system can be derived. The electricity for this system is generated by an alternator having a rotor. Being an a.c. electrical supply, it is desirable to keep the frequency of the supply constant, and thus to keep the speed of rotation of the alternator rotor constant. To this end, a controller is provided, to regulate the speed of the alternator rotor, by controlling a main drive system and an auxiliary drive system for the alternator.

With reference to the accompanying drawing, the main engine 11 provides both mechanical and heat energy at the disposal of the alternator 8. The main drive system 17 is driven by heat from the exhaust gas of the engine, and the auxiliary drive system 16 is driven by the rotation of a shaft of the main engine 11. The controller 1 controls the main drive system 17 and the auxiliary drive system 16 via control lines 14 and 19 respectively, sensing the speed of rotation of the alternator rotor via control line 15.

The main drive system 17 comprises an exhaust gas boiler 12, a steam supply pipe 21 provided with a control valve 3, a steam turbine 9, a steam return pipe 22 and a step down gear-box 20. The control valve 3 adjusts the amount of steam reaching the steam turbine 9, and may thus be used to control the power output of steam turbine 9. The controller 1 adjusts the setting of control valve 3 via control line 19.

The rotor of steam turbine 9 is attached via an input shaft to gear-box 20, an output shaft of which gear-box 20 is attached to the rotor of alternator 8. Thus rotation of the rotor of steam turbine 9 will cause rotation of the rotor of alternator 8, the ratios of the two speeds of rotation being determined by the ratio of gear-box 20. It is also possible to drive the alternator rotor directly from the rotor of the steam turbine. The auxiliary drive system 16 comprises a gear-box 4, hydraulic drive means, a clutch 6 and a coupling 7. The hydraulic drive means comprises a hydraulic pump 2, hydraulic supply line 23, hydraulic return line 24 and a hydraulic motor 5. The pump 2 is of the axial piston variable delivery type and the motor 5 is also of the axial piston type. An input shaft of gear box 4 is attached to the main engine 11, and an output shaft of gear-box 4 is attached to hydraulic pump 2. This pump 2, when operating, will raise the pressure of the hydraulic fluid in hydraulic supply line 23, which will cause the hydraulic motor 5 to operate. Hydraulic fluid is returned at lower pressure to the pump 2 via the hydraulic return line 24.

An output shaft of hydraulic motor 5 is connected to clutch 6, which will transmit the power from the hydraulic motor 5 to the alternator 8 unless the rotor of alternator 8 is rotating faster than the output shaft of hydraulic motor 5. The clutch 6 drives the alternator via a coupling 7, which in this embodiment is a gear coupling which allows for any misalignment in the coupling. The speed of the hydraulic motor 5 is controlled by varying the flow of oil through the hydraulic line 23. This flow is controlled by varying the stroke of the hydraulic pump 2. The speed of the hydraulic motor is monitored via control line 25 and controlled by the controller 1 via control line 14 connected to the hydraulic pump 2. The pressure in hydraulic line 23 is limited by adjusting the swash plate of the hydraulic pump 2 which is done by a control circuit and valve integral with the pump.

Prior to starting the main engine, the controller 1 sets the hydraulic pump 2 swash plates to the zero position so no hydraulic oil supply is obtained.

The main engine 11 is allowed to run and cause sufficient steam to be generated in the exhaust gas boiler 12. The steam valve 3 is opened and the turbine 9 and alternator 8 speed increased to the operating speed. The waste heat recovery system may then be used as normal. If insufficient power is available from the waste heat recovery system then the controller 1 alters the hydraulic motor swash plate position and starts the hydraulic motor 5. The speed of operation of the hydraulic system is set slightly lower than the speed of operation of the turbine driven system so that as the turbine slows down due to a lack of power, the clutch 6 engages when the speeds are equal and the hydraulic motor supplements the power.

The invention is not restricted to the specific details of the embodiment described above. For example, the hydraulic drive means may include more than one hydraulic pump and/or more than one hydraulic motor.

Also, the clutch 6 may be disengaged at a predetermined speed other than when the alternator rotor runs faster than the hydraulic motors. For example, it may be desired to provide a gear-box between the motor 5 and the alternator 8.

What I claim is:

1. A system for driving an alternator having a rotor by waste heat comprising:
    an engine from which waste heat is derived;
    main drive means for receiving the waste heat from the engine, and driving the rotor at a predetermined speed;
    auxiliary driving means for providing supplemental power from the engine to the rotor to maintain the rotor at said predetermined speed, said auxiliary driving means including,
    hydraulic drive means for driving the rotor,
    connecting means for engaging and disengaging the hydraulic drive means and the rotor; and
    control means responsive to the speed of the rotor for causing said main driving means to drive the rotor at a predetermined speed, for causing said connecting means to engage the hydraulic drive means to supplement said main driving means in driving the rotor whenever the rotor speed drops below the predetermined speed, and for causing said connecting means to disengage the hydraulic drive means whenever the rotor subsequently reaches said predetermined speed.

2. A system as claimed in claim 1, wherein the means for engaging and disengaging the hydraulic drive means is a clutch.

3. A system as claimed in claim 1, wherein the hydraulic drive means comprises at least one hydraulic motor supplied with oil from one or more hydraulic pumps.

4. A system as claimed in claim 3, wherein the or each hydraulic motor is of the axial piston type.

5. A system as claimed in claim 3, wherein the or each pump is pressure controlled to avoid excess pressures.

6. A system as claimed in claim 3, wherein the or each hydraulic pump is of the axial piston variable delivery type.

7. A system as claimed in claim 1, wherein coupling means are provided between the engagement and disengagement means and the alternator rotor.

8. A system as claimed in claim 7, wherein the coupling means is a gear coupling.

9. A system as claimed in claim 8, wherein the gear coupling is capable of allowing for any misalignment in the coupling.

10. A system as claimed in claim 1, in which the main drive to the alternator is a steam turbine.

11. A system as claimed in claim 1, wherein said main drive means includes valve means controlled by said control means, said control means causing said connecting means to engage or disengage said hydraulic drive means when said valve means are respectively fully open or beginning to close.

* * * * *